United States Patent
Qin et al.

(10) Patent No.: US 11,882,566 B2
(45) Date of Patent: Jan. 23, 2024

(54) COMMUNICATIONS METHOD AND APPARATUS

(71) Applicant: HUAWEI TECHNOLOGIES CO., LTD., Guangdong (CN)

(72) Inventors: Chao Qin, Shanghai (CN); Xiangzhen Kong, Shanghai (CN); Jiman Zhu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 440 days.

(21) Appl. No.: 17/326,896

(22) Filed: May 21, 2021

(65) Prior Publication Data

US 2021/0289537 A1    Sep. 16, 2021

Related U.S. Application Data

(63) Continuation of application No. PCT/CN2018/117986, filed on Nov. 28, 2018.

(51) Int. Cl.
*H04W 72/23* (2023.01)
*H04L 1/1812* (2023.01)
(Continued)

(52) U.S. Cl.
CPC ............ *H04W 72/23* (2023.01); *H04L 1/189* (2013.01); *H04L 1/1819* (2013.01); *H04W 24/10* (2013.01); *H04W 72/1263* (2013.01)

(58) Field of Classification Search
CPC . H04W 72/23; H04W 24/10; H04W 72/1263; H04L 1/1819; H04L 1/189
See application file for complete search history.

(56) References Cited

U.S. PATENT DOCUMENTS 10,038,538 B2   7/2018   Kim et al.
2006/0150051 A1  7/2006  Kwon et al.
(Continued)

FOREIGN PATENT DOCUMENTS

CN    103973418 A    8/2014
CN    105191389 A   12/2015
(Continued)

OTHER PUBLICATIONS

Huawei, HiSilicon, "Introduction of uplink HARQ-ACK feedback in Rel-15 MTC," 3GPP TSG RAN WG2 Meeting #101bis, R2-1804838, Sanya, China, Apr. 16-20, 2018, 2 pages.
(Continued)

*Primary Examiner* — Samina F Choudhry
(74) *Attorney, Agent, or Firm* — Fish & Richardson P.C.

(57) ABSTRACT

A communications method includes: sending a scheduling request to a terminal device through a PDCCH, where the scheduling request indicates the terminal device to send data to a network device based on a preset time interval; in response to not receiving the data that is sent by the terminal device through a PUSCH, determining, based on measurement gap configuration information of the terminal device, whether a time point at which the terminal device does not send the data is within a measurement gap window; and if it is determined that the time point at which the terminal device does not send the data is within the measurement gap window, sending, to the terminal device, a redundancy version number used for a next HARQ retransmission.

13 Claims, 5 Drawing Sheets

(51) Int. Cl.
*H04L 1/1867* (2023.01)
*H04W 24/10* (2009.01)
*H04W 72/1263* (2023.01)

(56) References Cited

U.S. PATENT DOCUMENTS

| | | |
|---|---|---|
| 2009/0046650 A1 | 2/2009 | Dalsgaard et al. |
| 2013/0235808 A1* | 9/2013 | Earnshaw ............ H04L 1/1887 370/329 |
| 2014/0146697 A1 | 5/2014 | Kim et al. |
| 2015/0016312 A1* | 1/2015 | Li ....................... H04W 74/006 370/280 |

FOREIGN PATENT DOCUMENTS

| | | |
|---|---|---|
| CN | 107889231 A | 4/2018 |
| CN | 108028732 A | 5/2018 |
| CN | 108809547 A | 11/2018 |
| WO | 2009157729 A2 | 12/2009 |
| WO | 2015175190 A1 | 11/2015 |

OTHER PUBLICATIONS

Office Action issued in Chinese Application No. 201880096454.X dated Aug. 27, 2021, 7 pages (with English translation).
Bgpp TS 36.321 V15.3.0 (Sep. 2018), "3rd Generation Partnership Project; Technical Specification Group Radio Access Network; Evolved Universal Terrestrial Radio Access (E-UTRA); Medium Access Control (MAC) protocol specification (Release 15)," Sep. 2018, 127 pages.
PCT International Search Report and Written Opinion in International Application No. PCT/CN2018/117986, dated Mar. 27, 2019, 15 pages.
1 Extended European Search Report issued in European Application No. 18941478.2 dated Sep. 24, 2021, 8 pages.

* cited by examiner

COMMUNICATIONS METHOD AND APPARATUS

CROSS-REFERENCE TO RELATED APPLICATIONS

This application is a continuation of International Application No. PCT/CN2018/117986, filed on Nov. 28, 2018, the disclosure of which is hereby incorporated by reference in its entirety.

TECHNICAL FIELD

This application relates to the field of communications technologies, and in particular, to a communications method and apparatus.

BACKGROUND

In a mobile communications system, user equipment (UE) needs to first perform inter-frequency or inter-RAT measurement before performing an inter-frequency or inter-RAT handover. When signal quality of a current serving cell of the UE is relatively poor and inter-frequency or inter-RAT measurement is triggered, a base station (Evolutional Node B, eNB) delivers a measurement gap configuration indicator to the UE. The measurement gap configuration indicator includes a measurement period of a measurement gap, and a measurement window and a measurement start time that are of the measurement gap. For example, the measurement window of the measurement gap is 6 ms, and the measurement period of the measurement gap is 40 ms or 80 ms. After receiving the measurement gap configuration indicator, the UE starts the measurement gap based on the measurement gap configuration indicator. Usually, the UE has only one receiver and can receive a signal on only one frequency at a same moment. Therefore, the UE cannot process any uplink and downlink channels within the measurement gap window, that is, the UE does not perform data transmission. For example, when the period of the measurement gap is 40 ms, the UE cannot process any uplink and downlink channels for continuous 6 ms in every 40 ms.

In frequency division duplex (FDD), a synchronous hybrid automatic repeat request (HARQ) is used in an uplink, and retransmission on a same HARQ channel is fixedly performed after 8 ms. Different redundancy version numbers are used for initial transmission and retransmission on a physical uplink shared channel (PUSCH). A redundancy version sequence provided in the communication protocol 36.321 is 0, 2, 3, and 1. Retransmission and a previous transmission of the retransmission change accumulatively based on the provided redundancy version sequence. Initial transmission and retransmission are used as an example. For example, if a redundancy version number 0 is used for initial transmission, a redundancy version number 2 is used for a next retransmission. A redundancy version number indicates that transmitted data blocks include different redundant parts. The eNB combines the data blocks that carry different redundant parts to increase a combination gain.

During uplink scheduling, to completely avoid the measurement gap for initial transmission and retransmission of the eNB, it needs to be ensured that none of a physical downlink control channel (PDCCH), the PUSCH, and a physical HARQ indicator channel (PHICH) falls within the measurement gap window. In this case, a quantity of uplink schedulable subframes decreases significantly, and an uplink rate decreases significantly. Therefore, during the uplink scheduling of the eNB, only some channels are prevented from falling within the measurement gap window during initial transmission, but these channels may fall within the measurement gap window during PUSCH retransmission. According to a stipulation in the communication protocol 36.321, if the UE fails to send data during uplink PUSCH transmission due to the measurement gap, non-adaptive PUSCH retransmission is performed on the HARQ channel during a next retransmission. During the non-adaptive retransmission, the UE uses resources of a previous PUSCH transmission for retransmission, and a redundancy version number used during the retransmission does not change accumulatively. During actual application, a case in which a redundancy version number used during retransmission may change based on the redundancy version sequence due to an implementation error on a UE side, while a redundancy version number used during retransmission does not change accumulatively according to the stipulation in the communication protocol 36.321 on an eNB side may occur. Therefore, there is a risk that the redundancy version numbers on the eNB side and the UE side are inconsistent, resulting in a higher bit error rate of the PUSCH.

SUMMARY

This application provides a communications method and apparatus, to eliminate a risk that redundancy version numbers on a network device side and a terminal device side are inconsistent, and reduce a bit error rate of a PUSCH.

According to a first aspect, this application provides a communication method. The method includes:

sending a scheduling request to a terminal device through a PDCCH, where the scheduling request is used to indicate the terminal device to send data to a network device based on a preset time interval; when not receiving the data that is sent by the terminal device through a PUSCH, determining, based on measurement gap configuration information of the terminal device, whether a time point at which the terminal device does not send the data this time is within a measurement gap window, where the measurement gap configuration information includes a measurement period of a measurement gap, the measurement gap window, and a measurement start time; and if it is determined that the time point at which the terminal device does not send the data this time is within the measurement gap window, sending, to the terminal device, a redundancy version number used for a next HARQ retransmission.

According to the communication method provided in the first aspect, after the network device sends the scheduling request to the terminal device, when not receiving the data that is sent by the terminal device through the PUSCH, the network device determines, based on the measurement gap configuration information of the terminal device, whether the time point at which the terminal device does not send the data this time is within the measurement gap window. If yes, the redundancy version number used for the next HARQ retransmission is sent to the terminal device, and the terminal device may retransmit the data based on the redundancy version number indicated by the network device. Therefore, it can be ensured that redundancy version numbers on a network device side and a terminal device side are consistent, to eliminate a risk that the redundancy version numbers on the network device side and the terminal device side are inconsistent, and reduce a bit error rate of the PUSCH.

In a possible design, the method further includes:

sending the measurement gap configuration information to the terminal device when receiving a measurement report that is sent by the terminal device and that is used to indicate that a signal value of a current serving cell of the terminal device is less than a preset threshold.

In a possible design, the determining, based on measurement gap configuration information of the terminal device, whether a time point at which the terminal device does not send the data this time is within a measurement gap window includes:

calculating, based on the measurement period of the measurement gap, the measurement gap window, and the measurement start time, whether the time point at which the terminal device does not send the data this time is within the measurement gap window.

In a possible design, the method further includes:

setting a measurement gap conflict flag for each uplink HARQ channel of the terminal device, and setting an initial value of the measurement gap conflict flag to a first value; and if it is determined that the time point at which the terminal device does not send the data this time is within the measurement gap window, setting a value of a measurement gap conflict flag of a HARQ channel that is occupied by the terminal device and on which the data is not sent this time to a second value, where a HARQ channel with a value of a measurement gap conflict flag being the first value uses non-adaptive retransmission during a next retransmission, and a HARQ channel with a value of a measurement gap conflict flag being the second value uses adaptive retransmission during a next retransmission.

According to the communication method provided in this implementation, a measurement gap conflict flag is set for each HARQ channel, and an initial value of the measurement gap conflict flag is the first value. When determining that the time at which the terminal device does not send the data this time is within the measurement gap window, the network device sets the value of the measurement gap conflict flag of the HARQ channel that is occupied by the terminal device and on which the data is not sent this time to the second value. In this way, when each HARQ channel is used to perform data transmission, a manner of performing a next data retransmission on each HARQ channel may be determined based on the value of the measurement gap conflict flag, thereby improving data retransmission efficiency and recording a historical status of each data transmission of the terminal device.

In a possible design, the sending, to the terminal device, a redundancy version number used for a next hybrid automatic repeat request HARQ retransmission includes:

sending a PDCCH to the terminal device, where the PDCCH carries the redundancy version number.

According to a second aspect, this application provides a communication method. The method includes:

after receiving a scheduling request that is sent by a network device through a PDCCH, sending data to the network device through a PUSCH based on a preset time interval; receiving a redundancy version number that is used for a next HARQ retransmission and that is sent by the network device, where the redundancy version number is sent when the network device does not receive the data that is sent by a terminal device through the PUSCH, and determines, based on measurement gap configuration information of the terminal device, that a time point at which the terminal device does not send the data this time is within a measurement gap window, and the measurement gap configuration information includes a measurement period of a measurement gap, the measurement gap window, and a measurement start time; and retransmitting the data to the network device based on the redundancy version number by using a HARQ channel that is occupied and on which the data is not sent this time.

According to the communication method provided in the second aspect, after receiving the scheduling request that is sent by the network device through the PDCCH, the terminal device sends the data to the network device through the PUSCH based on the preset time interval, receives the redundancy version number that is used for the next HARQ retransmission and that is sent by the network device, and retransmits the data to the network device based on the redundancy version number by using the HARQ channel that is occupied and on which the data is not sent this time. Therefore, it can be ensured that redundancy version numbers on a network device side and a terminal device side are consistent, to eliminate a risk that the redundancy version numbers on the network device side and the terminal device side are inconsistent, and reduce a bit error rate of the PUSCH.

In a possible design, the method further includes:

sending, to the network device, a measurement report that is used to indicate that a signal value of a current serving cell of the terminal device is less than a preset threshold; and receiving the measurement gap configuration information sent by the network device.

In a possible design, the receiving a redundancy version number that is used for a next hybrid automatic repeat request HARQ retransmission and that is sent by the network device includes:

receiving a PDCCH sent by the network device, where the PDCCH carries the redundancy version number.

According to a third aspect, this application provides a network device. The network device includes:

a sending module, configured to send a scheduling request to a terminal device through a PDCCH, where the scheduling request is used to indicate the terminal device to send data to the network device based on a preset time interval; and a processing module, configured to: when not receiving the data that is sent by the terminal device through a PUSCH, determine, based on measurement gap configuration information of the terminal device, whether a time point at which the terminal device does not send the data this time is within a measurement gap window, where the measurement gap configuration information includes a measurement period of a measurement gap, the measurement gap window, and a measurement start time, where the sending module is further configured to: if the processing module determines that the time point at which the terminal device does not send the data this time is within the measurement gap window, send, to the terminal device, a redundancy version number used for a next HARQ retransmission.

In a possible design, the sending module is further configured to:

send the measurement gap configuration information to the terminal device when a measurement report that is sent by the terminal device and that is used to indicate that a signal value of a current serving cell of the terminal device is less than a preset threshold is received.

In a possible design, the processing module is configured to:
calculate, based on the measurement period of the measurement gap, the measurement gap window, and the measurement start time, whether the time point at which the terminal device does not send the data this time is within the measurement gap window.

In a possible design, the processing module is further configured to:
set a measurement gap conflict flag for each uplink HARQ channel of the terminal device, and set an initial value of the measurement gap conflict flag to a first value; and
if it is determined that the time point at which the terminal device does not send the data this time is within the measurement gap window, set a value of a measurement gap conflict flag of a HARQ channel that is occupied by the terminal device and on which the data is not sent this time to a second value, where
a HARQ channel with a value of a measurement gap conflict flag being the first value uses non-adaptive retransmission during a next retransmission, and a HARQ channel with a value of a measurement gap conflict flag being the second value uses adaptive retransmission during a next retransmission.

In a possible design, the sending module is specifically configured to:
send a PDCCH to the terminal device, where the PDCCH carries the redundancy version number.

For beneficial effects of the network device provided in the third aspect and the possible designs of the third aspect, refer to the beneficial effects brought by the first aspect and the possible implementations of the first aspect. Details are not described herein again.

According to a fourth aspect, this application provides a terminal device. The terminal device includes:
a receiving module, configured to receive a scheduling request that is sent by a network device through a PDCCH; and
a sending module, configured to send data to the network device through a PUSCH based on a preset time interval, where
the receiving module is further configured to receive a redundancy version number that is used for a next HARQ retransmission and that is sent by the network device, where the redundancy version number is sent when the network device does not receive the data that is sent by the terminal device through the PUSCH, and determines, based on measurement gap configuration information of the terminal device, that a time point at which the terminal device does not send the data this time is within a measurement gap window, and the measurement gap configuration information includes a measurement period of a measurement gap, the measurement gap window, and a measurement start time; and
the sending module is further configured to retransmit the data to the network device based on the redundancy version number by using a HARQ channel that is occupied and on which the data is not sent this time.

In a possible design, the sending module is further configured to:
send, to the network device, a measurement report that is used to indicate that a signal value of a current serving cell of the terminal device is less than a preset threshold; and
the receiving module is further configured to receive the measurement gap configuration information sent by the network device.

In a possible design, the receiving module is specifically configured to:
receive a PDCCH sent by the network device, where the PDCCH carries the redundancy version number.

For beneficial effects of the terminal device provided in the fourth aspect and the possible designs of the fourth aspect, refer to the beneficial effects brought by the second aspect and the possible implementations of the second aspect. Details are not described herein again.

According to a fifth aspect, this application provides a network device. The network device includes a memory and a processor, where
the memory is configured to store program instructions; and
the processor is configured to invoke the program instructions in the memory, to perform the communication method according to any one of the first aspect or the possible designs of the first aspect.

According to a sixth aspect, this application provides a terminal device. The terminal device includes a memory and a processor, where
the memory is configured to store program instructions; and
the processor is configured to invoke the program instructions in the memory, to perform the communication method according to any one of the second aspect or the possible designs of the second aspect.

According to a seventh aspect, this application provides a readable storage medium. The readable storage medium stores executable instructions; and when at least one processor of a network device executes the executable instructions, the network device performs the communication method according to any one of the first aspect or the possible designs of the first aspect.

According to an eighth aspect, this application provides a readable storage medium. The readable storage medium stores executable instructions; and when at least one processor of a terminal device executes the executable instructions, the terminal device performs the communication method according to any one of the second aspect or the possible designs of the second aspect.

According to a ninth aspect, this application provides a program product. The program product includes executable instructions, and the executable instructions are stored in a readable storage medium. At least one processor of a network device may read the executable instructions in the readable storage medium, and the at least one processor executes the executable instructions, so that the network device implements the communication method according to any one of the first aspect or the possible designs of the first aspect.

According to a tenth aspect, this application provides a program product. The program product includes executable instructions, and the executable instructions are stored in a readable storage medium. At least one processor of a terminal device may read the executable instructions in the readable storage medium, and the at least one processor executes the executable instructions, so that the terminal device implements the communication method according to any one of the second aspect or the possible designs of the second aspect.

According to an eleventh aspect, this application provides a chip. The chip is connected to a memory, or a memory is integrated into the chip. When a software program stored in the memory is executed, the communication method according to any one of the first aspect or the possible designs of the first aspect or according to any one of the second aspect or the possible designs of the second aspect is implemented.

DESCRIPTION OF EMBODIMENTS

The embodiments of this application may be applied to a wireless communications system. It should be noted that the wireless communications system in the embodiments of this application includes but is not limited to: a narrowband internet of things (NB-IoT) system, a global system for mobile communications (GSM) system, an enhanced data rate for GSM evolution (EDGE) system, a wideband code division multiple access (WCDMA) system, a code division multiple access 2000 (CDMA2000) system, a time division-synchronous code division multiple access (TD-SCDMA) system, a long term evolution system (LTE) system, and a fifth-generation mobile communications (5G) system.

Communications apparatuses in this application mainly include a network device and a terminal device.

The network device may be a base station, an access point, or an access network device, or may be a device that is in an access network and that communicates with a wireless terminal through one or more sectors on an air interface. The network device may be configured to: perform mutual conversion on a received over-the-air frame and an IP packet, and serve as a router between the wireless terminal and another part of the access network, where the another part of the access network may include an Internet protocol (IP) network. The network device may further coordinate attribute management of the air interface. For example, the network device may be an evolved NodeB eNB or eNodeB) in long term evolution (LTE), a relay node or an access point, or a NodeB in a 5G network, for example, a gNB. This is not limited herein.

The terminal device may be a wireless terminal or a wired terminal. The wireless terminal may refer to a device that provides a user with voice and/or other service data connectivity, a handheld device with a radio connection function, or another processing device connected to a radio modem. The wireless terminal may communicate with one or more core networks through a RAN. The wireless terminal may be a mobile terminal, such as a mobile phone (or referred to as a "cellular" phone) and a computer with a mobile terminal, for example, may be a portable, pocket-sized, handheld, computer built-in, or vehicle-mounted mobile apparatus, which exchanges a voice and/or data with the radio access network. For example, it may be a device such as a personal communications service (PCS) phone, a cordless telephone, a session initiation protocol (SIP) phone, a wireless local loop (WLL) station, or a personal digital assistant (PDA). The wireless terminal may also be referred to as a system, a subscriber unit, a subscriber station, a mobile station, a mobile, a remote station, a remote terminal, an access terminal, a user terminal, a user agent, or a user device or User Equipment). This is not limited herein.

Figure 1:
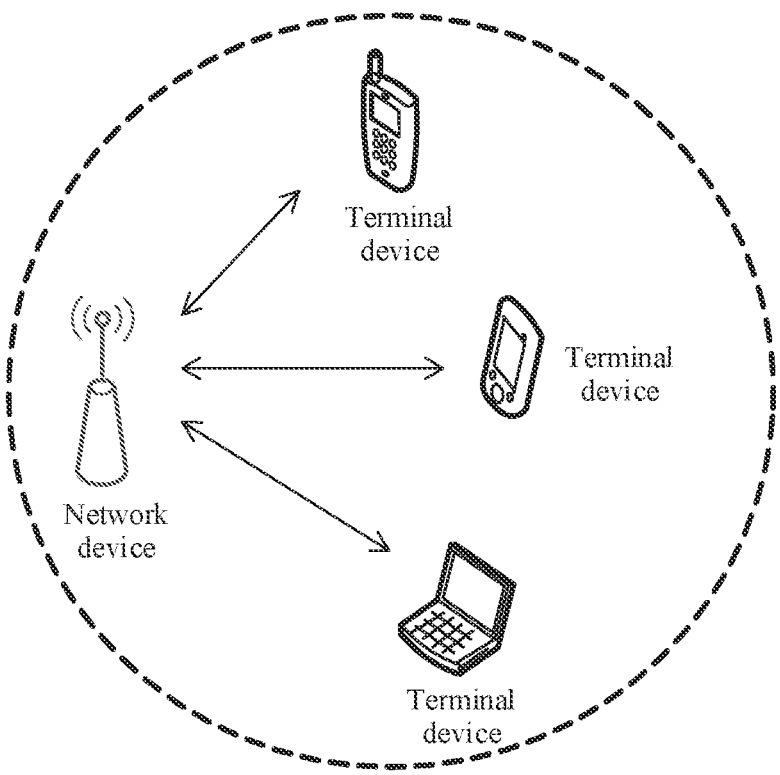
FIG. 1 is a schematic architectural diagram of a communications system.

FIG. 1 is a schematic architectural diagram of a communications system. As shown in FIG. 1, the communications system in this embodiment of this application may include one or more network devices and one or more terminal devices, and the network devices communicate with the terminal devices.

In a related technology, according to a stipulation in the communication protocol 36.321, if UE fails to send data during uplink PUSCH transmission due to a measurement gap, that is, the UE cannot send the data in a measurement gap window, non-adaptive PUSCH retransmission is performed on a HARQ channel used for sending the data during a next retransmission. During the non-adaptive retransmission, the UE uses resources of a previous PUSCH transmission for retransmission, and a redundancy version number used during the retransmission does not change accumulatively. During actual application, a case in which a redundancy version number used during retransmission may change based on a redundancy version sequence due to an implementation error on a UE side, while a redundancy version number used during retransmission does not change accumulatively according to a stipulation in the communication protocol 36.321 on an eNB side may occur. Therefore, there is a risk that the redundancy version numbers on the eNB side and the UE side are inconsistent, resulting in a higher bit error rate of a PUSCH. To resolve this problem, the embodiments of this application provide a communication method. When not receiving data that is sent by a terminal device through a PUSCH, after determining that a time point at which the terminal device does not send the data is within a measurement gap window, a network device indicates, to the terminal device a redundancy version number used for a next HARQ retransmission. The terminal device retransmits the data based on the redundancy version number indicated by the network device. Therefore, it can be ensured that redundancy version numbers on a network device side and a terminal device side are consistent, to eliminate a risk that the redundancy version numbers on the network device side and the terminal device side are inconsistent, and reduce a bit error rate of the PUSCH. The following describes a communications method and apparatus provided in the embodiments of this application in detail with reference to the accompanying drawings.

Figure 2:
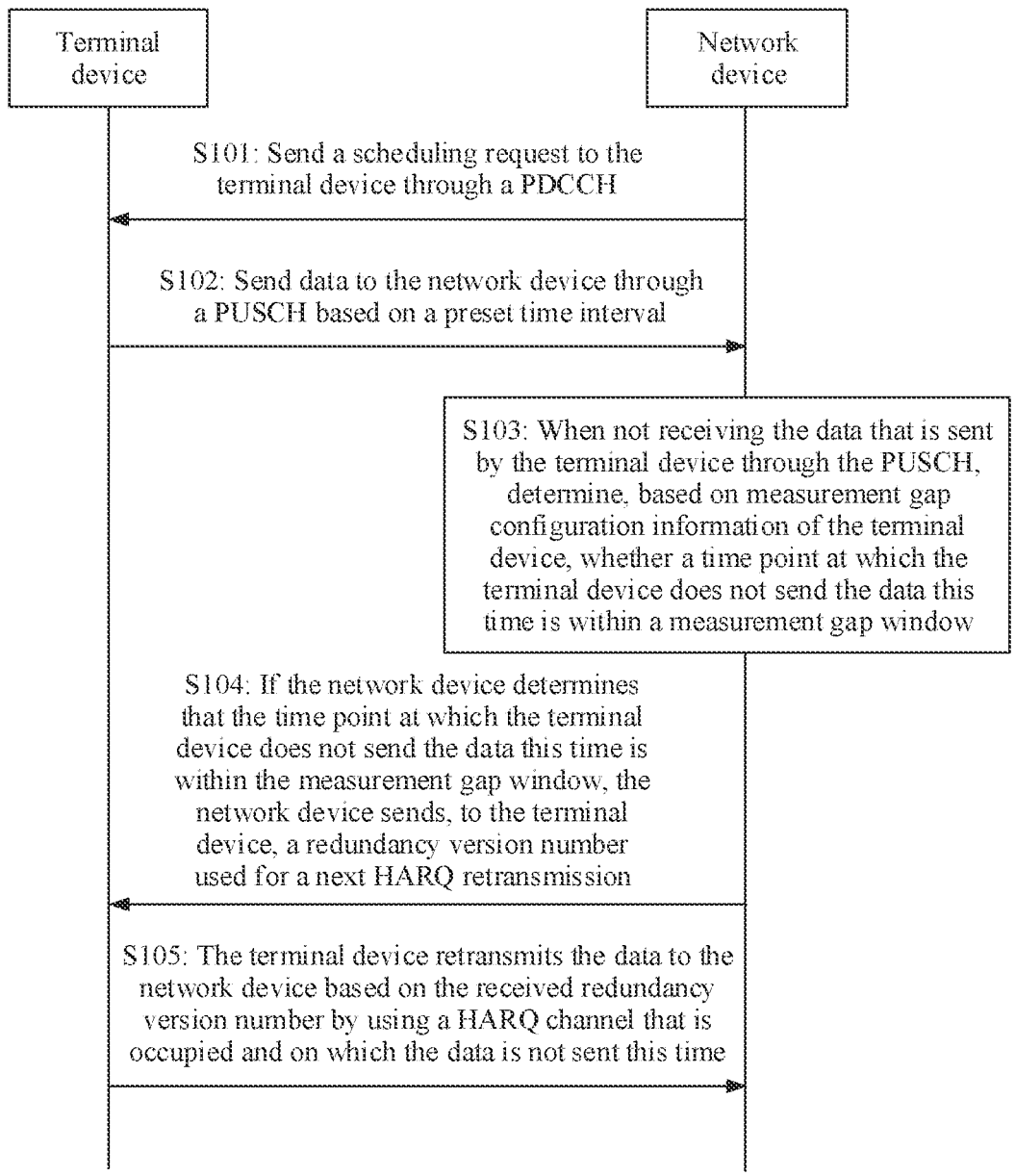
FIG. 2 is an interaction flowchart of an embodiment of a communication method according to this application.

FIG. 2 is an interaction flowchart of an embodiment of a communication method according to this application. As shown in FIG. 2, the method in this embodiment may include the following steps.

S101: A network device sends a scheduling request to a terminal device through a PDCCH, where the scheduling request is used to indicate the terminal device to send data to the network device based on a preset time interval.

S102: The terminal device sends the data to the network device through a PUSCH based on the preset time interval.

Specifically, the network device sends the scheduling request to the terminal device through the PDCCH, where the scheduling request is used to indicate that the terminal device can send the data to the network device. After receiving the scheduling request, the terminal device starts to send the data to the network device at the preset time interval. The preset time interval is known to the network device and the terminal device, or is carried in the scheduling request. For example, the time interval is 8 ms. After receiving the scheduling request, the terminal device initially transmits the data to the network device once through the PUSCH. If the initial transmission of the data fails, the first retransmission is performed after 8 ms; and if the first retransmission fails, the second retransmission is performed 8 ms after the first retransmission. Correspondingly, the network device receives, at the preset time interval, the data sent by the terminal device.

S103. When not receiving the data that is sent by the terminal device through the PUSCH, the network device determines, based on measurement gap configuration information of the terminal device, whether a time point at which the terminal device does not send the data this time is within a measurement gap window, where the measurement gap configuration information includes a measurement period of a measurement gap, the measurement gap window, and a measurement start time.

Specifically, for example, if the network device does not receive the data after the terminal device initially transmits the data, the network device determines, based on the measurement gap configuration information of the terminal device, whether a time point at which the terminal device initially transmits the data is within the measurement gap window. The measurement gap configuration information includes the measurement period of the measurement gap, the measurement gap window, and the measurement start time. For example, if the measurement gap window is 6 ms, and the measurement period is 40 ms, the terminal device performs inter-frequency or inter-RAT measurement for continuous 6 ms in every 40 ms, and the terminal device does not send the data for continuous 6 ms in every 40 ms. Therefore, within the time period of 6 ms, the network device cannot receive the data sent by the terminal device. The measurement gap configuration information is configured by the network device for the terminal device. In a configuration manner, the method in this embodiment may further include the following steps.

The terminal device sends, to the network device, a measurement report that is used to indicate that a signal value of a current serving cell of the terminal device is less than a preset threshold.

The network device sends the measurement gap configuration information to the terminal device when receiving the measurement report that is sent by the terminal device and that is used to indicate that the signal value of the current serving cell of the terminal device is less than the preset threshold.

Specifically, when a signal of the current serving cell in which the terminal device is located is relatively weak, that is, the signal value of the current serving cell of the terminal device is less than the preset threshold, the terminal device sends the measurement report to the network device, to notify the network device that the signal of the current serving cell is relatively weak. When receiving the measurement report, the network device sends the measurement gap configuration information to the terminal device. After receiving the measurement gap configuration information, the terminal device starts inter-frequency or inter-RAT measurement, to perform an inter-frequency or inter-RAT handover. The measurement gap configuration information is configured by the network device for the terminal device. Therefore, the network device has known the measurement gap configuration information configured for the terminal device.

Optionally, in S103, that the network device determines, based on measurement gap configuration information of the terminal device, whether a time point at which the terminal device does not send the data this time is within a measurement gap window may be specifically:

The network device calculates, based on the measurement period of the measurement gap, the measurement gap window, and the measurement start time, whether the time point at which the terminal device does not send the data this time is within the measurement gap window. For example, if the measurement gap window is 6 ms, and the measurement period is 80 ms, the network device may learn of, based on the scheduling request sent to the terminal device, a time point of each data transmission of the terminal device, and the network device may calculate, from the beginning of the measurement start time, whether the time point at which the terminal device does not send the data this time is within the measurement gap window of 6 ms in the measurement period of 80 ms.

S104: If the network device determines that the time point at which the terminal device does not send the data this time is within the measurement gap window, the network device sends, to the terminal device, a redundancy version number used for a next HARQ retransmission.

Specifically, in a possible implementation, that the network device sends, to the terminal device, a redundancy version number used for a next HARQ retransmission may be as follows: The network device sends a PDCCH to the terminal device, where the PDCCH carries the redundancy version number. For example, the redundancy version number used for the next HARQ retransmission may be specifically indicated to the terminal device by using downlink control information (DCI) 0. Correspondingly, the terminal device receives the PDCCH sent by the network device, where the PDCCH carries the redundancy version number.

S105: The terminal device retransmits the data to the network device based on the received redundancy version number by using a HARQ channel that is occupied and on which the data is not sent this time.

In this embodiment, optionally, before or after S101, the method in this embodiment may further include the following steps.

S106 The network device sets a measurement gap conflict flag for each uplink HARQ channel of the terminal device, and sets an initial value of the measurement gap conflict flag to a first value.

Specifically, retransmission on a same HARQ channel is fixedly performed after 8 ms. There are a total of eight uplink HARQ channels, and the network device sets initial values of measurement gap conflict flags of the eight uplink HARQ channels to the first value.

S107: If it is determined that the time point at which the terminal device does not send the data this time is within the measurement gap window, set a value of a measurement gap conflict flag of the HARQ channel that is occupied by the terminal device and on which the data is not sent this time to a second value, where a HARQ channel with a value of a measurement gap conflict flag being the first value uses non-adaptive retransmission during a next retransmission, and a HARQ channel with a value of a measurement gap conflict flag being the second value uses adaptive retransmission during a next retransmission.

Specifically, for example, the first value is 0, and the second value is 1. A HARQ channel with a value of a measurement gap conflict flag being 0 uses non-adaptive retransmission during a next retransmission. During the non-adaptive retransmission, the terminal device uses resources of a previous PUSCH transmission for retransmission, and a redundancy version number used during the retransmission does not change accumulatively. A HARQ channel with a value of a measurement gap conflict flag being 1 uses adaptive retransmission during a next retransmission. During the adaptive retransmission, the network device sends a redundancy version number used for a next HARQ retransmission to the terminal device. The redundancy version number used for the next HARQ retransmission is indicated to the terminal device, so that the terminal device retransmits the data based on the redundancy version number indicated by the network device. Therefore, it can be ensured that redundancy version numbers on a network device side and a terminal device side are consistent, to eliminate a risk that the redundancy version numbers on the network device side and the terminal device side are inconsistent, and reduce a bit error rate of the PUSCH. Alternatively, the first value and the second value may be other values. This is not limited in this embodiment of this application.

In this embodiment, a measurement gap conflict flag is set for each HARQ channel, and an initial value of the measurement gap conflict flag is the first value. When determining that the time at which the terminal device does not send the data this time is within the measurement gap window, the network device sets the value of the measurement gap conflict flag of the HARQ channel that is occupied by the terminal device and on which the data is not sent this time to the second value. In this way, when each HARQ channel is used to perform data transmission, a manner of performing a next data retransmission on each HARQ channel may be determined based on the value of the measurement gap conflict flag, thereby improving data retransmission efficiency and recording a historical status of each data transmission of the terminal device.

According to the communication method provided in this embodiment, after the network device sends the scheduling request to the terminal device, when not receiving the data that is sent by the terminal device through the PUSCH, the network device determines, based on the measurement gap configuration information of the terminal device, whether the time point at which the terminal device does not send the data this time is within the measurement gap window. If yes, the redundancy version number used for the next HARQ retransmission is sent to the terminal device, and the terminal device may retransmit the data based on the redundancy version number indicated by the network device. Therefore, it can be ensured that the redundancy version numbers on the network device side and the terminal device side are consistent, to eliminate the risk that the redundancy version numbers on the network device side and the terminal device side are inconsistent, and reduce the bit error rate of the PUSCH.

The technical solution of the method embodiment shown in FIG. 2 is described in detail below by using a specific embodiment.

Figure 3:
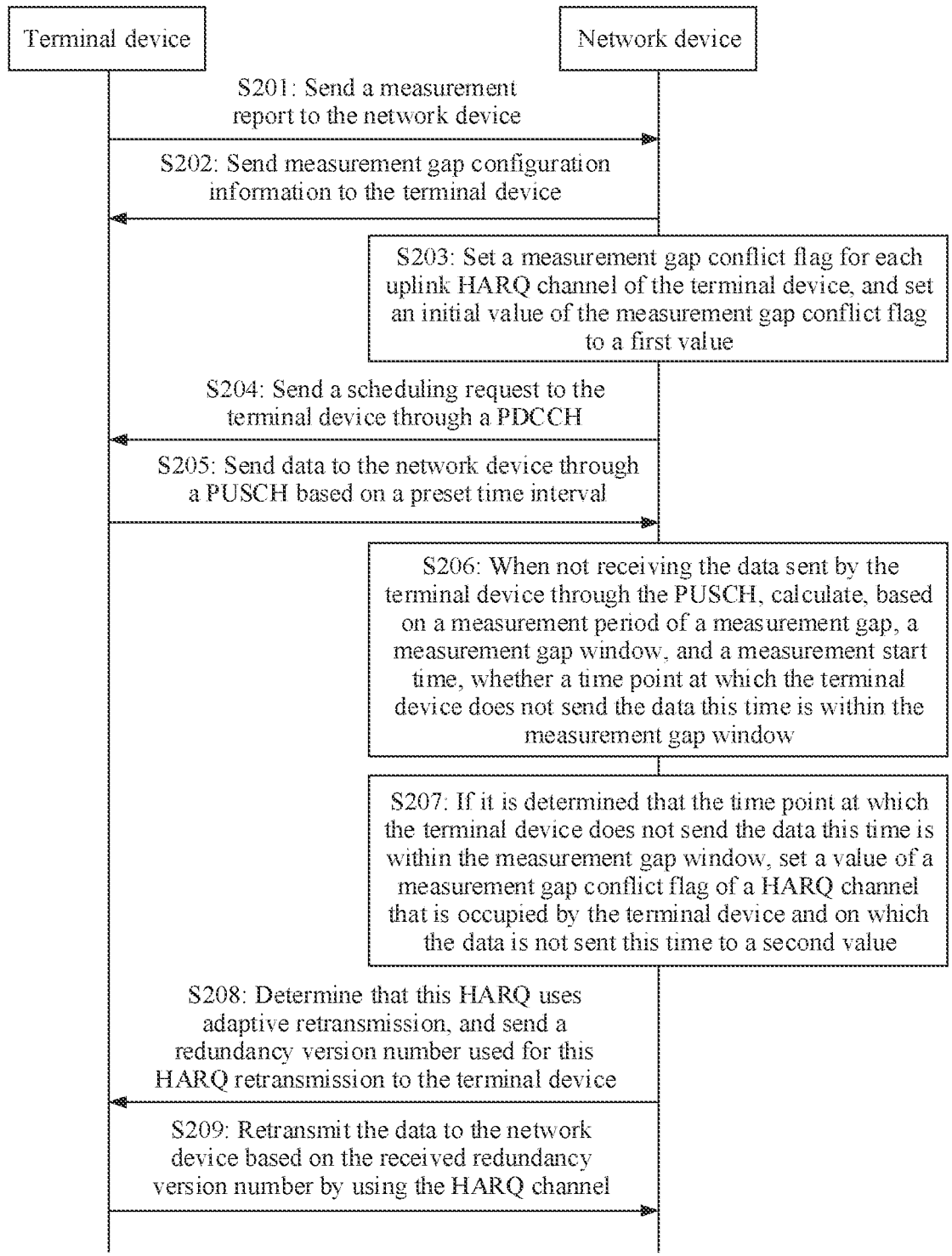
FIG. 3 is an interaction flowchart of an embodiment of a communication method according to this application.

FIG. 3 is an interaction flowchart of an embodiment of a communication method according to this application. As shown in FIG. 3, the method in this embodiment may include the following steps.

S201: A terminal device sends, to a network device, a measurement report that is used to indicate that a signal value of a current serving cell of the terminal device is less than a preset threshold.

S202: When receiving the measurement report sent by the terminal device, the network device sends measurement gap configuration information to the terminal device, where the measurement gap configuration information includes a measurement period of a measurement gap, a measurement gap window, and measurement start time.

Specifically, after receiving the measurement gap configuration information, the terminal device starts inter-frequency or inter-RAT measurement, to perform an inter-frequency or inter-RAT handover.

S203: The network device sets a measurement gap conflict flag for each uplink HARQ channel of the terminal device, and sets an initial value of the measurement gap conflict flag to a first value.

Specifically, retransmission on a same HARQ channel is fixedly performed after 8 ms. There are a total of eight uplink HARQ channels, and the network device sets initial values of measurement gap conflict flags of the eight uplink HARQ channels to the first value.

S204: The network device sends a scheduling request to the terminal device through a PDCCH, where the scheduling request is used to indicate the terminal device to send data to the network device based on a preset time interval.

Specifically, the preset time interval is known to the network device and the terminal device, or is carried in the scheduling request.

S205: The terminal device sends the data to the network device through a PUSCH based on the preset time interval.

Specifically, after receiving the scheduling request, the terminal device starts to send the data to the network device at the preset time interval. Correspondingly, the network device receives, at the preset time interval, the data sent by the terminal device.

S206: When not receiving the data that is sent by the terminal device through the PUSCH, the network device calculates, based on the measurement period of the measurement gap, the measurement gap window, and the measurement start time, whether a time point at which the terminal device does not send the data this time is within the measurement gap window.

S207: If the network device determines that the time point at which the terminal device does not send the data this time is within the measurement gap window, the network device sets a value of a measurement gap conflict flag of a HARQ channel that is occupied by the terminal device and on which the data is not sent this time to a second value.

A HARQ channel with a value of a measurement gap conflict flag being the first value uses non-adaptive retransmission during a next retransmission, and a HARQ channel with a value of a measurement gap conflict flag being the second value uses adaptive retransmission during a next retransmission.

S208: When retransmission is performed after 8 ms on the HARQ channel that is occupied and on which the data is not sent this time, if the network device determines that the value of the measurement gap conflict flag of the HARQ channel is the second value, the network device determines that this HARQ uses adaptive retransmission, and sends a redundancy version number used for this HARQ retransmission to the terminal device.

Specifically, the network device may send a PDCCH to the terminal device, where the PDCCH carries the redundancy version number. Correspondingly, the terminal device receives the PDCCH sent by the network device, where the PDCCH carries the redundancy version number.

S209: The terminal device retransmits the data to the network device based on the received redundancy version number by using the HARQ channel.

According to the communication method provided in this embodiment, the network device sets a measurement gap conflict flag for each uplink HARQ channel of the terminal device, and sets an initial value of the measurement gap conflict flag to the first value. After the network device sends the scheduling request to the terminal device, when not receiving the data that is sent by the terminal device through the PUSCH, the network device calculates, based on the measurement period of the measurement gap, the measurement gap window, and the measurement start time, whether the time point at which the terminal device does not send the data this time is within the measurement gap window. If yes, the network device sets the value of the measurement gap conflict flag of the HARQ channel that is occupied by the terminal device and on which the data is not sent this time to the second value. The HARQ channel with the value of the measurement gap conflict flag being the first value uses non-adaptive retransmission during the next retransmission, and the HARQ channel with the value of the measurement gap conflict flag being the second value uses adaptive retransmission during the next retransmission. When retransmission is performed after 8 ms on the HARQ channel that is occupied and on which the data is not sent this time, when determining that this HARQ uses adaptive retransmission, the network device sends the redundancy version number used for this HARQ retransmission to the terminal device. The terminal device may retransmit the data based on the redundancy version number sent by the network device. Therefore, it can be ensured that redundancy version numbers on a network device side and a terminal device side are consistent, to eliminate a risk that the redundancy version numbers on the network device side and the terminal device side are inconsistent, and reduce a bit error rate of the PUSCH. In addition, a measurement gap conflict flag whose initial value is the first value is set for each HARQ channel. When determining that the time at which the terminal device does not send the data this time is within the measurement gap window, the network device sets the value of the measurement gap conflict flag of the HARQ channel that is occupied by the terminal device and on which the data is not sent this time to the second value. In this way, when each HARQ channel is used to perform data transmission, a manner of performing a next data retransmission on each HARQ channel may be determined based on the value of the measurement gap conflict flag, thereby improving data retransmission efficiency and recording a historical status of each data transmission of the terminal device.

It may be understood that in the foregoing method embodiments, an operation performed by the terminal device may alternatively be implemented by a component (for example, a chip or a circuit) that may be used in a terminal, and an operation performed by the network device may alternatively be implemented by a component (for example, a chip or a circuit) that may be used in a network device.

Figure 4:
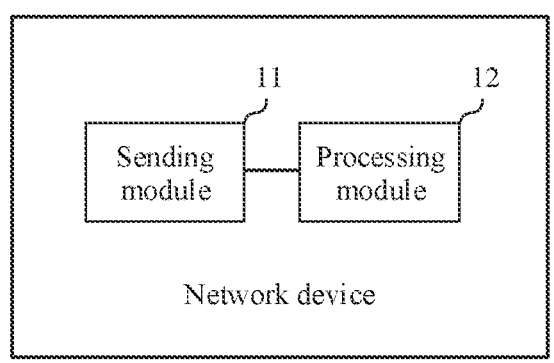
FIG. 4 is a schematic structural diagram of an embodiment of a network device according to this application.

FIG. 4 is a schematic structural diagram of an embodiment of a network device according to this application. The network device may alternatively be a component (for example, a chip or a circuit) that may be used in a network device. As shown in FIG. 4, the network device in this embodiment may include: a sending module 11 and a processing module 12. The sending module 11 is configured to send a scheduling request to a terminal device through a PDCCH, where the scheduling request is used to indicate the terminal device to send data to the network device based on a preset time interval.

The processing module 12 is configured to: when not receiving the data that is sent by the terminal device through a PUSCH, determine, based on measurement gap configuration information of the terminal device, whether a time point at which the terminal device does not send the data this time is within a measurement gap window, where the measurement gap configuration information includes a measurement period of a measurement gap, the measurement gap window, and a measurement start time.

The sending module 11 is further configured to: if the processing module 12 determines that the time point at which the terminal device does not send the data this time is within the measurement gap window, send, to the terminal device, a redundancy version number used for a next hybrid automatic repeat request HARQ retransmission.

Optionally, the sending module 11 is further configured to:

send the measurement gap configuration information to the terminal device when a measurement report that is sent by the terminal device and that is used to indicate that a signal value of a current serving cell of the terminal device is less than a preset threshold is received.

Optionally, the processing module 12 is configured to:

calculate, based on the measurement period of the measurement gap, the measurement gap window, and the measurement start time, whether the time point at which the terminal device does not send the data this time is within the measurement gap window.

Optionally, the processing module 12 is further configured to:

set a measurement gap conflict flag for each uplink HARQ channel of the terminal device, and set an initial value of the measurement gap conflict flag to a first value; and if it is determined that the time point at which the terminal device does not send the data this time is within the measurement gap window, set a value of a measurement gap conflict flag of a HARQ channel that is occupied by the terminal device and on which the data is not sent this time to a second value.

A HARQ channel with a value of a measurement gap conflict flag being the first value uses non-adaptive retransmission during a next retransmission, and a HARQ channel with a value of a measurement gap conflict flag being the second value uses adaptive retransmission during a next retransmission.

Optionally, the sending module 11 is specifically configured to:

send a PDCCH to the terminal device, where the PDCCH carries the redundancy version number.

The network device in this embodiment may be configured to perform the technical solution in the method embodiment shown in FIG. 2 or FIG. 3, and implementation principles and technical effects thereof are similar. For an operation implemented by each module, refer to related descriptions in the method embodiments. Details are not described herein again. The module herein may alternatively be replaced with a component or a circuit.

Figure 5:
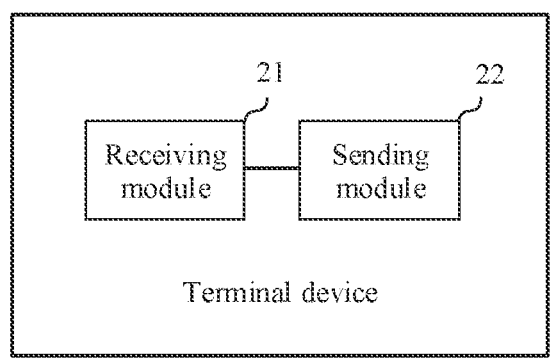
FIG. 5 is a schematic structural diagram of an embodiment of a terminal device according to this application.

FIG. 5 is a schematic structural diagram of an embodiment of a terminal device according to this application. The terminal device may alternatively be a component (for example, a chip or a circuit) that may be used in a terminal device. As shown in FIG. 5, the terminal device in this embodiment may include: a receiving module 21 and a sending module 22.

The receiving module 21 is configured to receive a scheduling request that is sent by a network device through a physical downlink control channel PDCCH.

The sending module 22 is configured to send data to the network device through a physical uplink shared channel PUSCH based on a preset time interval.

The receiving module 21 is further configured to receive a redundancy version number that is used for a next hybrid automatic repeat request HARQ retransmission and that is sent by the network device. The redundancy version number is sent when the network device does not receive the data that is sent by the terminal device through the PUSCH, and determines, based on measurement gap configuration information of the terminal device, that a time point at which the terminal device does not send the data this time is within a measurement gap window, and the measurement gap configuration information includes a measurement period of a measurement gap, the measurement gap window, and a measurement start time.

The sending module 22 is further configured to retransmit the data to the network device based on the redundancy version number by using a HARQ channel that is occupied and on which the data is not sent this time.

Optionally, the sending module 22 is further configured to:

send, to the network device, a measurement report that is used to indicate that a signal value of a current serving cell of the terminal device is less than a preset threshold; and the receiving module 21 is further configured to receive the measurement gap configuration information sent by the network device.

Optionally, the receiving module 21 is specifically configured to:

receive a PDCCH sent by the network device, where the PDCCH carries the redundancy version number.

The terminal device in this embodiment may be configured to perform the technical solution in the method embodiment shown in FIG. 2 or FIG. 3, and implementation principles and technical effects thereof are similar. For an operation implemented by each module, refer to related descriptions in the method embodiments. Details are not described herein again. The module herein may alternatively be replaced with a component or a circuit.

In this application, functional modules of the network device or the terminal device may be divided based on the foregoing method examples. For example, each functional module may be divided corresponding to each function, or two or more functions may be integrated into one processing module. The integrated module may be implemented in a form of hardware, or may be implemented in a form of a software functional module. It should be noted that, in the embodiments of this application, division into the modules is an example, and is merely a logical function division. During actual implementation, another division manner may be used.

Figure 6:
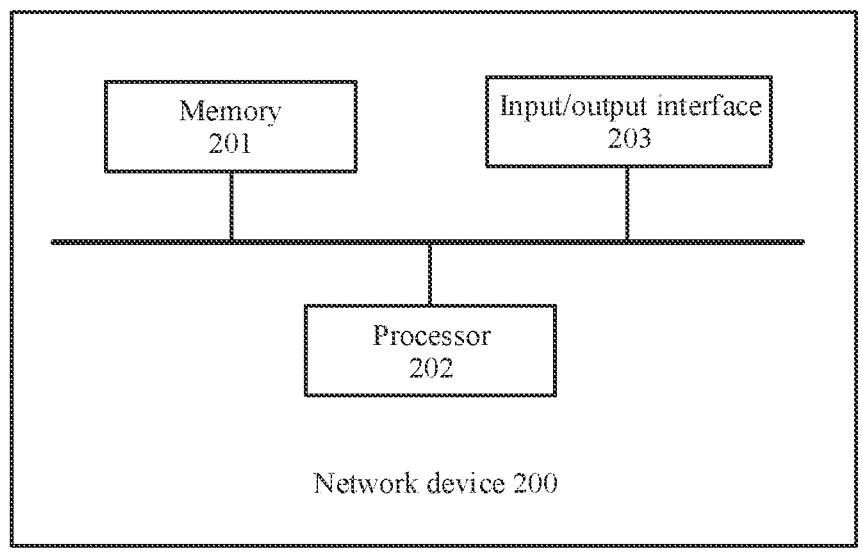
FIG. 6 is a schematic structural diagram of a network device according to this application.

FIG. 6 is a schematic structural diagram of a network device according to this application. The network device 200 includes:

a memory 201, configured to store program instructions, where the memory 201 may be a flash; and a processor 202, configured to invoke and execute the program instructions in the memory, to implement steps corresponding to the network device in the communication method in FIG. 2 or FIG. 3. For details, refer to the related descriptions in the foregoing method embodiments.

The network device 200 may further include an input/output interface 203. The input/output interface 203 may include an independent output interface and an independent input interface, or may be an integrated interface integrating input and output. The output interface is configured to output data, and the input interface is configured to obtain input data. The output data is a general term of output in the foregoing method embodiments, and the input data is a general term of input in the foregoing method embodiments.

The network device 200 may be configured to perform the steps and/or procedures corresponding to the network device in the foregoing method embodiments.

Figure 7:
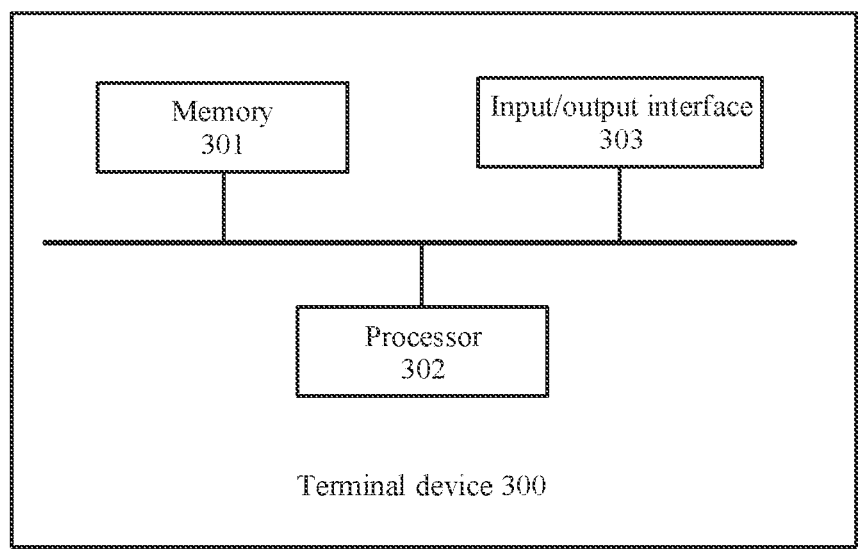
FIG. 7 is a schematic structural diagram of a terminal device according to this application.

FIG. 7 is a schematic structural diagram of a terminal device according to this application. The terminal device 300 includes:

a memory 301, configured to store program instructions, where the memory 301 may be a flash; and a processor 302, configured to invoke and execute the program instructions in the memory, to implement steps corresponding to the terminal device in the communication method in FIG. 2 or FIG. 3. For details, refer to the related descriptions in the foregoing method embodiments.

The terminal device 300 may further include an input/output interface 303. The input/output interface 303 may include an independent output interface and an independent input interface, or may be an integrated interface integrating input and output. The output interface is configured to output data, and the input interface is configured to obtain input data. The output data is a general term of output in the foregoing method embodiments, and the input data is a general term of input in the foregoing method embodiments.

The terminal device 300 may be configured to perform the steps and/or procedures corresponding to the terminal device in the foregoing method embodiments.

This application further provides a readable storage medium. The readable storage medium stores executable instructions. When at least one processor of a network device executes the executable instructions, the network device performs the communication method in the foregoing method embodiments.

This application further provides a readable storage medium. The readable storage medium stores executable instructions. When at least one processor of a terminal device executes the executable instructions, the terminal device performs the communication method in the foregoing method embodiments.

This application further provides a program product. The program product includes executable instructions, and the executable instructions are stored in a readable storage medium. At least one processor of a network device may read the executable instructions in the readable storage medium, and the at least one processor executes the executable instructions, so that the network device implements the communication method in the foregoing method embodiments.

This application further provides a program product. The program product includes executable instructions, and the executable instructions are stored in a readable storage medium. At least one processor of a terminal device may read the executable instructions in the readable storage medium, and the at least one processor executes the executable instructions, so that the terminal device implements the communication method in the foregoing method embodiments.

This application further provides a chip. The chip is connected to a memory, or a memory is integrated into the chip. When a software program stored in the memory is executed, the communication method in the foregoing method embodiments is implemented.

A person of ordinary skill in the art may understand that all or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

What is claimed is:

1. A communication method, comprising:
    sending a scheduling request to a terminal device through a physical downlink control channel (PDCCH), Wherein the scheduling request indicates the terminal device to send data to a network device based on a preset time interval;
    in response to not receiving the data that is sent by the terminal device through a physical uplink shared channel (PUSCH), determining, based on measurement Imp configuration information of the terminal device, whether a time point at which the terminal device does not send the data is within a measurement gap window, wherein the measurement gap configuration information comprises a measurement period of a measurement gap, the measurement gap window, and a measurement start time; and
    in response to determining that the time point at which the terminal device does not send the data is within the measurement gap window, sending, to the terminal device, a redundancy version number for a next hybrid automatic repeat request (HARQ) retransmission.

2. The method according to claim 1, wherein the method further comprises:
    sending the measurement gap configuration information to the terminal device when receiving a measurement report that is sent by the terminal device and that indicates that a signal value of a current serving cell of the terminal device is less than a preset threshold.

3. The method according to claim 1, wherein the determining, based on measurement gap configuration information of the terminal device, whether a time point at which the terminal device does not send the data is within a measurement gap window comprises:
    calculating, based on the measurement period of the measurement gap, the measurement gap window, and the measurement start time, whether the time point at which the terminal device does not send the data is within the measurement gap window.

4. The method according to claim 1, wherein the method further comprises:
    setting a measurement gap conflict flag for each uplink HARQ channel of the terminal device;
    setting an initial value of the measurement gap conflict flag to a first value; and
    in response to determining that the time point at which the terminal device does not send the data is within the measurement gap window, setting a value of a measurement gap conflict flag of a HARQ channel that is occupied by the terminal device and on which the data is not sent to a second value, wherein
    a HARQ channel with a value of a measurement gap conflict flag being the first value uses non-adaptive retransmission during a next retransmission, and a HARQ channel with a value of a measurement gap conflict flag being the second value uses adaptive retransmission during a next retransmission.

5. The method according to claim 1, wherein the sending, to the terminal device, the redundancy version number for the next HARQ retransmission comprises:
    sending a PDCCH to the terminal device, wherein the PDCCH carries the redundancy version number.

6. A network device, comprising:
    at least one processor; and
    one or more memories coupled to the at least one processor and storing programming instructions for execution by the at least one processor to cause the network device to:
        send a scheduling request to a terminal device through a physical downlink control channel (PDCCH), wherein the scheduling request indicates the terminal device to send data to the network device based on a preset time interval; and
        in response to not receiving the data that is sent by the terminal device through a physical uplink shared channel (PUSCH), determine, based on measurement gap configuration information of the terminal device, whether a time point at which the terminal device does not send the data is within a measurement gap window, wherein the measurement gap configuration information comprises a measurement period of a measurement gap, the measurement gap window, and a measurement start time, wherein
            in response to determining that the time point at which the terminal device does not send the data is within the measurement gap window, send, to the terminal device, a redundancy version number for a next hybrid automatic repeat request (HARQ) retransmission.

7. The network device according to claim 6, wherein the programming instructions, when executed by the at least one processor, cause the network device to:
    send the measurement gap configuration information to the terminal device when a measurement report that is sent by the terminal device and that indicates that a signal value of a current serving cell of the terminal device is less than a preset threshold is received.

8. The network device according to claim 6, wherein the programming instructions, when executed by the at least one processor, cause the network device to:
    calculate, based on the measurement period of the measurement gap, the measurement gap window, and the measurement start time, whether the time point at which the terminal device does not send the data is within the measurement gap window.

9. The network device according to claim 6, wherein the programming instructions, when executed by the at least one processor, cause the network device to:
set a measurement gap conflict flag for each uplink HARQ channel of the terminal device;
set an initial value of the measurement gap conflict flag to a first value; and
in response to determining that the time point at which the terminal device does not send the data is within the measurement gap window, set a value of a measurement gap conflict flag of a HARQ channel that is occupied by the terminal device and on which the data is not sent to a second value, wherein
a HARQ channel with a value of a measurement gap conflict flag being the first value uses non-adaptive retransmission during a next retransmission, and a HARQ channel with a value of a measurement gap conflict flag being the second value uses adaptive retransmission during a next retransmission.

10. The network device according to claim 6, wherein the programming instructions, when executed by the at least one processor, cause the network device to:
send a PDCCH to the terminal device, wherein the PDCCH carries the redundancy version number.

11. A terminal device, comprising:
at least one processor; and
one or more memories coupled to the at least one processor and storing programming instructions for execution by the at least one processor to cause the terminal device to:
receive a scheduling request that is sent by a network device through a physical downlink control channel (PDCCH); and
send data to the network device through a physical uplink shared channel (PUSCH) based on a preset time interval, wherein
receive a redundancy version number that is used for a next hybrid automatic repeat request (HARQ) retransmission and that is sent by the network device, wherein the redundancy version number is sent in response to the network device determines, based on measurement gap configuration information of the terminal device, that a time point at which the terminal device does not send the data is within a measurement gap window, and the measurement gap configuration information comprises a measurement period of a measurement gap, the measurement gap window, and a measurement start time; and
retransmit the data to the network device based on the redundancy version number by using a HARQ channel that is occupied and on which the data is not sent.

12. The terminal device according to claim 11, wherein the programming instructions, when executed by the at least one processor, cause the terminal device to:
send, to the network device, a measurement report that indicates that a signal value of a current serving cell of the terminal device is less than a preset threshold; and
receive the measurement gap configuration information sent by the network device.

13. The terminal device according to claim 11, wherein the programming instructions, when executed by the at least one processor, cause the terminal device to:
receive a PDCCH sent by the network device, wherein the PDCCH carries the redundancy version number.

* * * * *

UNITED STATES PATENT AND TRADEMARK OFFICE
CERTIFICATE OF CORRECTION

| | | |
|---|---|---|
| PATENT NO. | : 11,882,566 B2 | |
| APPLICATION NO. | : 17/326896 | |
| DATED | : January 23, 2024 | |
| INVENTOR(S) | : Chao Qin, Xiangzhen Kong and Jiman Zhu | |

It is certified that error appears in the above-identified patent and that said Letters Patent is hereby corrected as shown below:

In the Claims

Column 17, Line 35, Claim 1, please delete "Wherein" and insert therefore -- wherein --;

Column 17, Line 40, Claim 1, please delete "Imp" and insert therefore -- gap --.

Signed and Sealed this
Eleventh Day of June, 2024

Katherine Kelly Vidal
*Director of the United States Patent and Trademark Office*